United States Patent
Peng et al.

(10) Patent No.: US 10,775,842 B1
(45) Date of Patent: Sep. 15, 2020

(54) PORTABLE ELECTRONIC DEVICE

(71) Applicants: INVENTEC (PUDONG) TECHNOLOGY CORPORATION, Shanghai (CN); INVENTEC CORPORATION, Taipei (TW)

(72) Inventors: Chi-Zen Peng, Taipei (TW); Chia-Chen Chen, Taipei (TW); Ting-Yuan Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/565,281

(22) Filed: Sep. 9, 2019

(30) Foreign Application Priority Data

May 29, 2019 (CN) .......................... 2019 1 0456720

(51) Int. Cl.
*G06F 1/16* (2006.01)
*F28D 15/02* (2006.01)
*G06F 1/20* (2006.01)

(52) U.S. Cl.
CPC ........... *G06F 1/1615* (2013.01); *F28D 15/02* (2013.01); *G06F 1/1681* (2013.01); *G06F 1/1683* (2013.01); *G06F 1/203* (2013.01)

(58) Field of Classification Search
CPC .......... G06F 1/20; G06F 1/203; G06F 1/1615; G06F 2200/203; F28D 15/02
See application file for complete search history.

(56) References Cited

U.S. PATENT DOCUMENTS

| | | | | |
|---|---|---|---|---|
| 5,796,581 A | * | 8/1998 | Mok | G06F 1/203 165/104.33 |
| 5,847,925 A | * | 12/1998 | Progl | G06F 1/203 361/679.47 |
| 6,175,493 B1 | * | 1/2001 | Gold | G06F 1/203 174/15.2 |
| 6,189,602 B1 | * | 2/2001 | Tanahashi | G06F 1/203 165/86 |
| 6,377,452 B1 | * | 4/2002 | Sasaki | G06F 1/203 165/104.33 |
| 6,507,488 B1 | * | 1/2003 | Cipolla | G06F 1/203 165/104.33 |
| 6,507,490 B2 | * | 1/2003 | Sasaki | G06F 1/203 16/223 |

(Continued)

*Primary Examiner* — Abhishek M Rathod
*Assistant Examiner* — Keith DePew
(74) *Attorney, Agent, or Firm* — Maschoff Brennan

(57) ABSTRACT

A portable electronic device including host body, display body, hinge and heat pipe assembly. The host body includes base and heat source disposed on base. Side of positioning structure is connected to first fixed part. First fixed part is fixed to base. Second fixed part is fixed to metal casing. Heat pipe assembly includes first heat pipe and second heat pipe. End part of first heat pipe has insertion hole. End part of second heat pipe is pivotally inserted into insertion hole of end part of first heat pipe. Another end part of first heat pipe is in thermal contact with heat source. Another end part of second heat pipe is in thermal contact with metal casing. Another side of positioning structure is fixed to end part of first heat pipe so as to keep pivot part and end part of first heat pipe coaxial.

8 Claims, 7 Drawing Sheets

(56) References Cited

U.S. PATENT DOCUMENTS

| | | | | |
|---|---|---|---|---|
| 6,519,147 B2* | 2/2003 | Nakagawa | ............ | G06F 1/1616 165/80.4 |
| 6,595,269 B2* | 7/2003 | Mitchell | ............ | F28D 15/0233 165/104.26 |
| 6,771,498 B2* | 8/2004 | Wang | ............ | G06F 1/203 165/104.33 |
| 7,907,397 B2* | 3/2011 | Hung | ............ | G06F 1/1616 165/104.33 |
| 10,551,888 B1* | 2/2020 | North | ............ | H05K 7/20327 |
| 10,579,112 B2* | 3/2020 | North | ............ | G06F 1/1616 |
| 2002/0001176 A1* | 1/2002 | Shibasaki | ............ | G06F 1/203 361/679.52 |
| 2002/0051339 A1* | 5/2002 | Ohashi | ............ | G06F 1/203 361/679.46 |
| 2002/0075643 A1* | 6/2002 | Nakagawa | ............ | G06F 1/1616 361/679.52 |
| 2004/0008475 A1* | 1/2004 | Ohashi | ............ | F28F 1/22 361/679.53 |
| 2004/0042174 A1* | 3/2004 | Tomioka | ............ | G06F 1/203 361/679.53 |
| 2004/0042176 A1* | 3/2004 | Niwatsukino | ............ | F28D 15/0266 361/699 |
| 2004/0080908 A1* | 4/2004 | Wang | ............ | G06F 1/203 361/679.47 |
| 2004/0114324 A1* | 6/2004 | Kusaka | ............ | G06F 1/203 361/679.53 |
| 2004/0188069 A1* | 9/2004 | Tomioka | ............ | G06F 1/203 165/104.33 |
| 2005/0007730 A1* | 1/2005 | Ohashi | ............ | G06F 1/203 361/679.47 |
| 2005/0117298 A1* | 6/2005 | Koga | ............ | G06F 1/203 361/699 |
| 2005/0160752 A1* | 7/2005 | Ghoshal | ............ | G06F 1/203 62/259.2 |
| 2005/0174714 A1* | 8/2005 | Ishikawa | ............ | F28D 1/0308 361/103 |
| 2006/0039112 A1* | 2/2006 | Minamitani | ............ | C09K 5/10 361/699 |
| 2006/0171113 A1* | 8/2006 | Wu | ............ | G06F 1/203 361/679.26 |
| 2006/0219388 A1* | 10/2006 | Terakado | ............ | G06F 1/203 165/80.4 |
| 2007/0070599 A1* | 3/2007 | Chang | ............ | G06F 1/203 361/679.46 |
| 2008/0130221 A1* | 6/2008 | Varadarajan | ............ | G06F 1/203 361/679.52 |
| 2009/0279262 A1* | 11/2009 | Huang | ............ | G06F 1/203 361/704 |
| 2009/0310307 A1* | 12/2009 | Lin | ............ | G06F 1/203 361/700 |
| 2010/0091450 A1* | 4/2010 | Hung | ............ | G06F 1/1616 361/679.52 |
| 2014/0098489 A1* | 4/2014 | Chiriac | ............ | G06F 1/203 361/679.54 |
| 2018/0329464 A1* | 11/2018 | Lin | ............ | G06F 1/203 |
| 2019/0254194 A1* | 8/2019 | Paavola | ............ | F28D 15/0208 |

* cited by examiner

PORTABLE ELECTRONIC DEVICE

CROSS-REFERENCE TO RELATED APPLICATIONS

This non-provisional application claims priority under 35 U.S.C. § 119(a) on Patent Application No(s). 201910456720.1 filed in China, on May 29, 2019, the entire contents of which are hereby incorporated by reference.

BACKGROUND OF THE INVENTION

Technical Field of the Invention

The invention relates to a portable electronic device, more particularly to a portable electronic device including a heat pipe assembly.

Description of the Related Art

In a conventional portable computer, there are two heat pipes in thermal contact with the heat source in the host body and the metal casing of the display body to dissipate heat generated by the heat source to the metal casing. Since the display body is hinged to the host body, the two heat pipes shall be pivotable relative to each other.

SUMMARY OF THE INVENTION

One embodiment of this invention provides a portable electronic device including a host body, a display body, a hinge and a heat pipe assembly. The host body includes a base and a heat source disposed on the base. The display body includes a metal casing and a display device disposed on the metal casing. The hinge includes a first fixed part, a pivot part, a second fixed part and a positioning structure. Two opposite sides of the pivot part are respectively pivotally connected to the first fixed part and the second fixed part. A side of the positioning structure is connected to the first fixed part. The first fixed part is fixed to the base. The second fixed part is fixed to the metal casing. The heat pipe assembly includes a first heat pipe and a second heat pipe. An end part of the first heat pipe has an insertion hole. An end part of the second heat pipe is pivotally inserted into the insertion hole of the end part of the first heat pipe. Another end part of the first heat pipe is in thermal contact with the heat source. Another end part of the second heat pipe is in thermal contact with the metal casing. Another side of the positioning structure is fixed to the end part of the first heat pipe so as to keep the pivot part and the end part of the first heat pipe coaxial.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
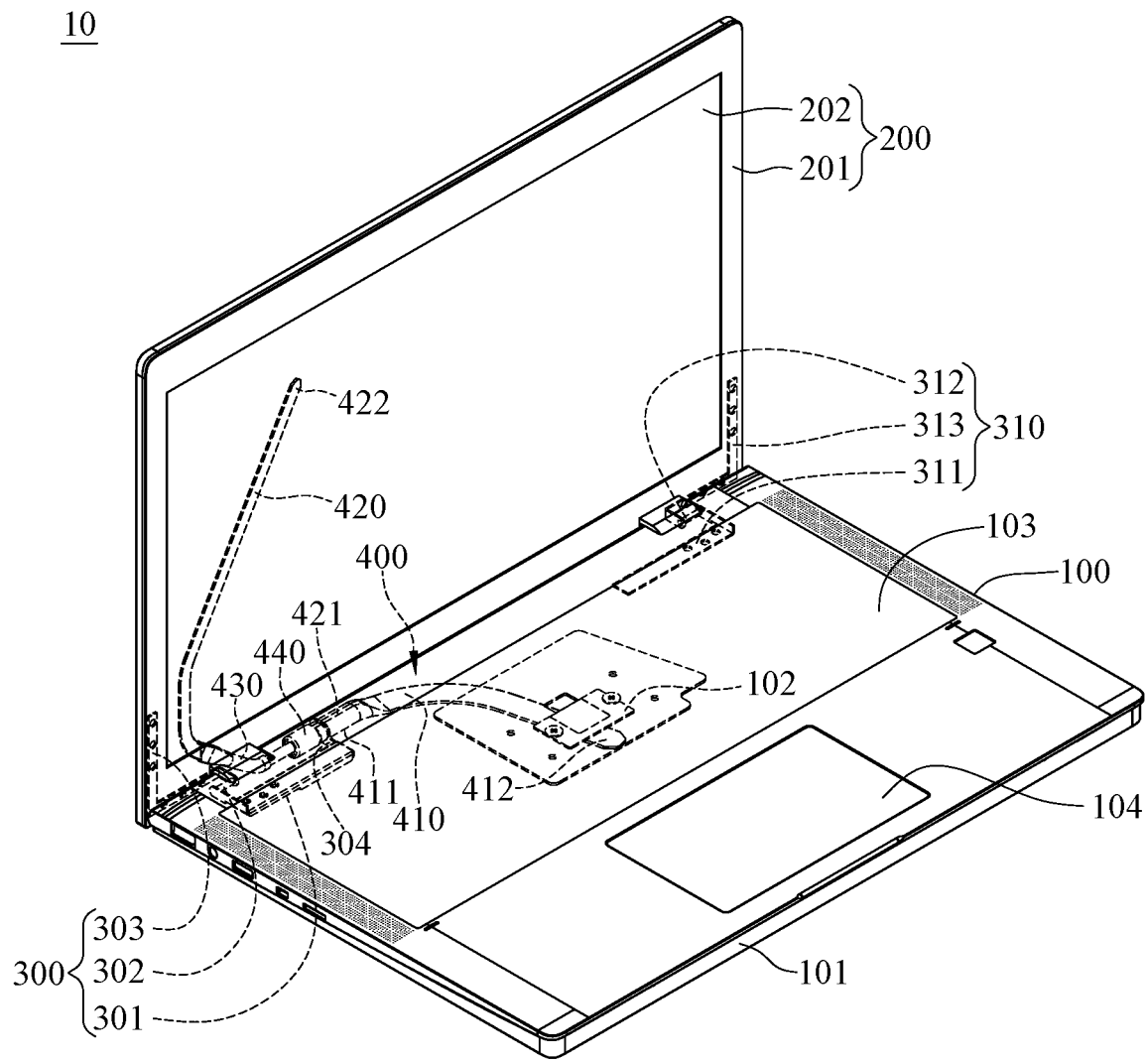
FIG. 1 is a perspective view of a portable electronic device according to a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, where FIG. 1 is a perspective view of a portable electronic device 10 according to a first embodiment of the invention.

The portable electronic device 10 includes a host body 100, a display body 200, a first hinge 300, a second hinge 310 and a heat pipe assembly 400.

In this embodiment, the host body 100 includes, for example, a base 101, a heat source 102, a keyboard assembly 103 and a touch panel 104. The heat source 102, the keyboard assembly 103 and the touch panel 104 are disposed on the base 101. The heat source 102 is, for example, a central processing unit (CPU) or other electronic or electrical components that will generate heat during operation. The keyboard assembly 103 and the touch panel 104 are input interfaces for user to operate the portable electronic device 10. For the purpose of a clear illustration of the internals of the base 101, key caps of the keyboard assembly 103 are omitted from FIG. 1. The display body 200 includes a metal casing 201 and a display device 202 disposed on the metal casing 201.

Figure 2:
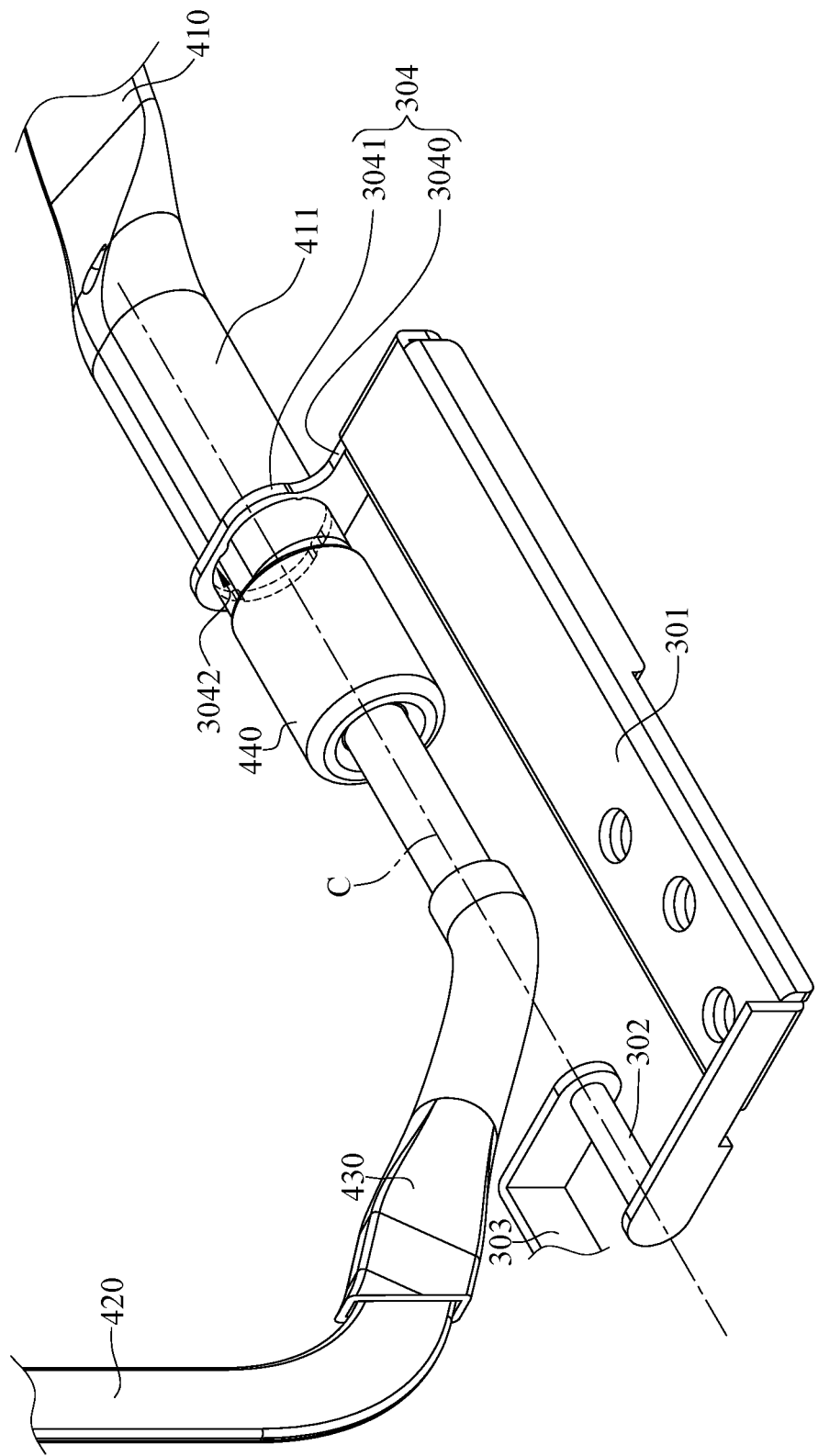
FIG. 2 is a partially enlarged perspective view of a heat assembly and a hinge of the portable electronic device in FIG. 1.
Figure 3:
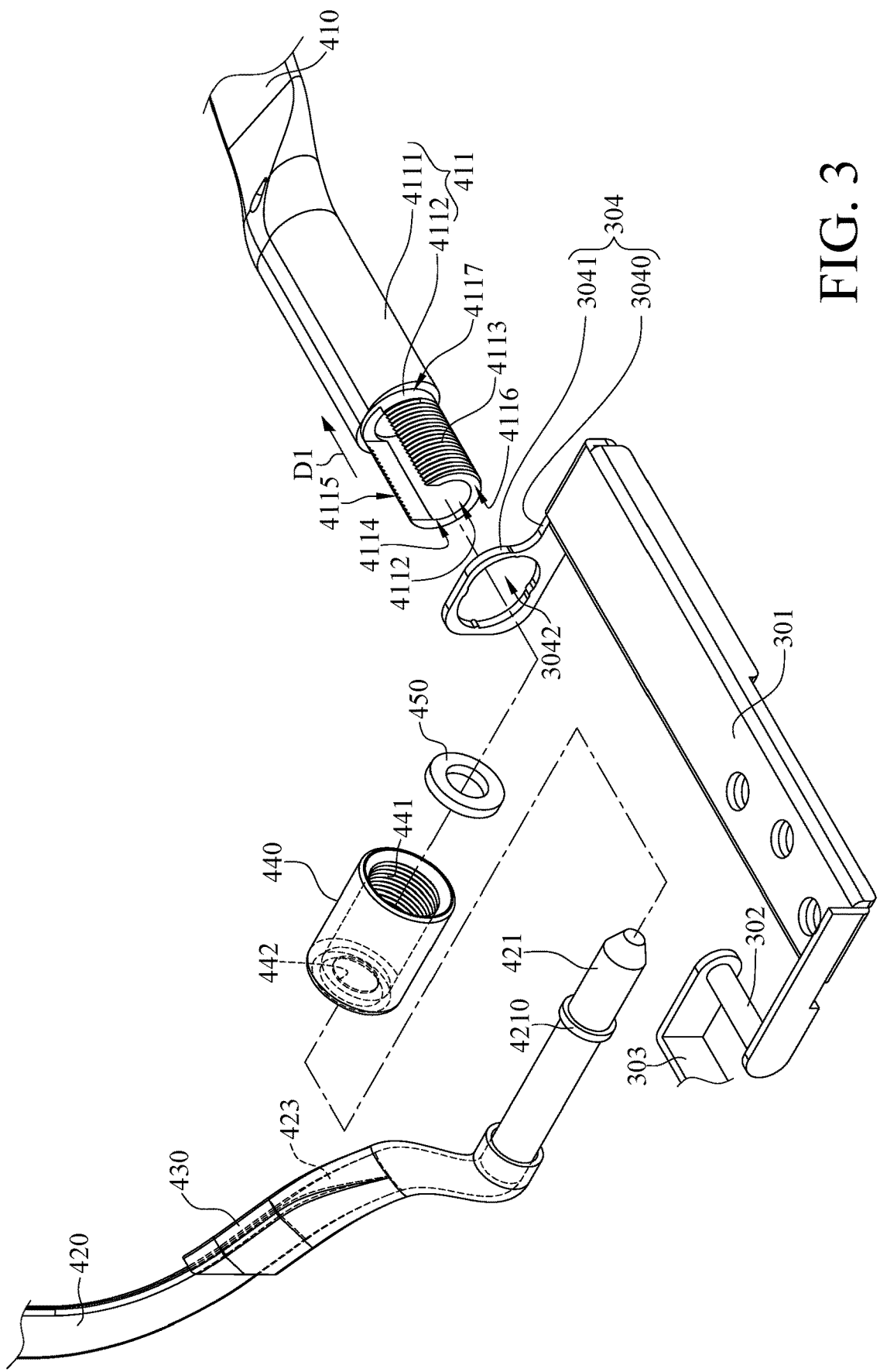
FIG. 3 is an exploded view of the heat assembly and the hinge in FIG. 2.

Please refer to FIG. 2 and FIG. 3, where FIG. 2 is a partially enlarged perspective view of the heat assembly 400 and the first hinge 300 of the portable electronic device 10 in FIG. 1, and FIG. 3 is an exploded view of the heat assembly 400 and the first hinge 300 in FIG. 2.

The first hinge 300 includes a first fixed part 301, a pivot part 302, a second fixed part 303 and a positioning structure 304. Two opposite ends of the pivot part 302 are respectively pivotally connected to the first fixed part 301 and the second fixed part 303. The first fixed part 301 is fixed to the base 101, and the second fixed part 303 is fixed to the metal casing 201.

The positioning structure 304 and the first fixed part 301 are, for example, integrally formed or made of a single piece. In this embodiment, the positioning structure 304 includes a body part 3040 and a ring-shaped part 3041. The ring-shaped part 3041 protrudes from the body part 3040. In more detail, the ring-shaped part 3401 has a hole 3042, and the ring-shaped part 3401 and the pivot part 302 both are disposed on a central axis C, and the ring ring-shaped part 3041 and the pivot part 302 are coaxial.

The second hinge 310 includes a first fixed part 311, a pivot part 312 and a second fixed part 313. Two opposite ends of the pivot part 312 are respectively pivotally connected to the first fixed part 311 and the second fixed part 313. The first fixed part 311 is fixed to the base 101. The second fixed part 313 is fixed to the metal casing 201. In addition, the first fixed parts 301 and 311 are fixed to the base 101, and they are respectively located adjacent to two opposite sides of the base 101. The second fixed part 303 and 313 are respectively fixed to two opposite sides of the metal casing 201. The first hinge 300 and the second hinge 310 allows the metal casing 201 to be pivoted relative to the base 101.

Note that the second hinge 310 is optional. In other embodiments, the portable electronic device may not have the second hinge 310; in such a case, the first hinge can be positioned to a proper location to enable a stable pivoting movement of the metal casing and the base.

Figure 4:
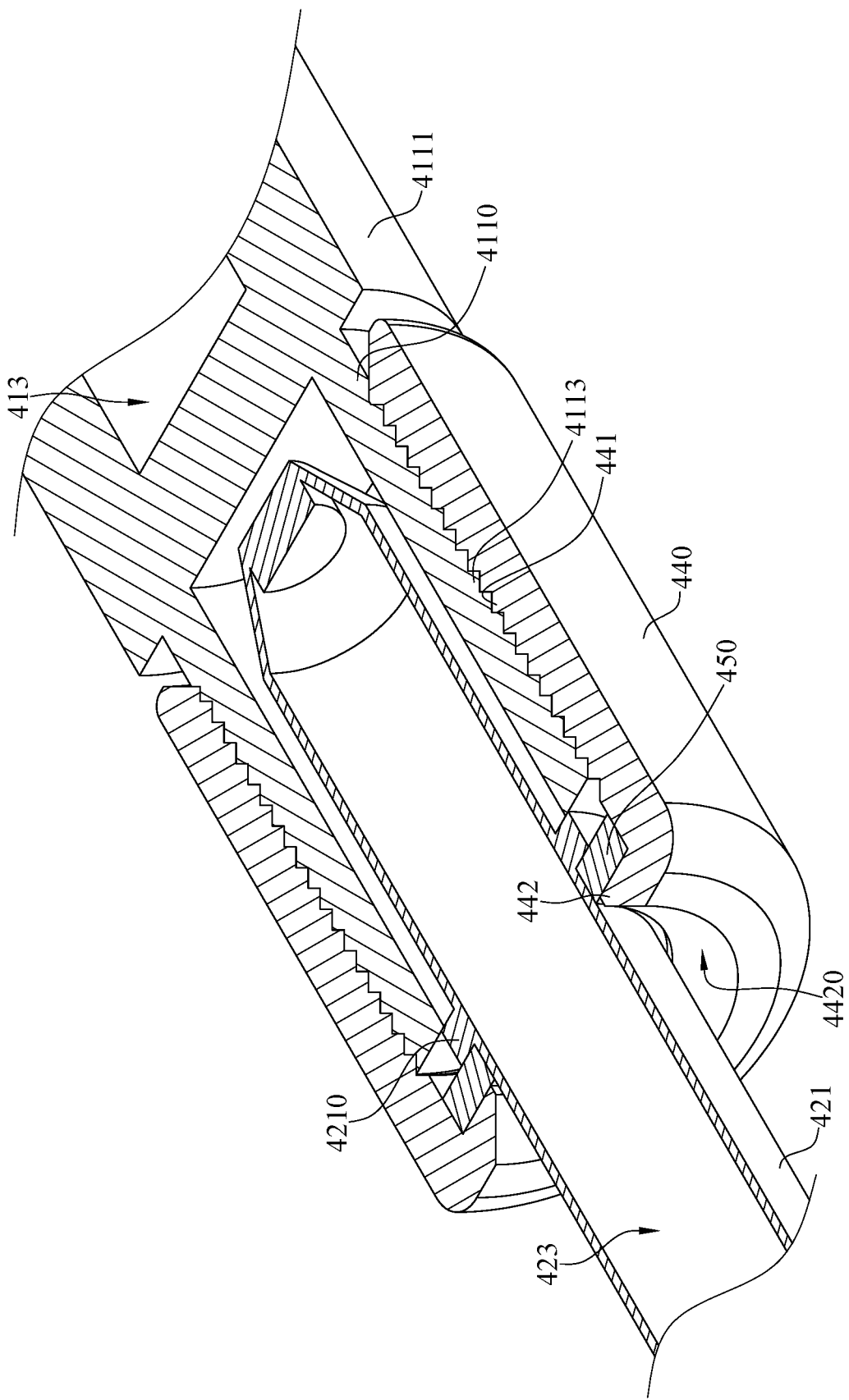
FIG. 4 is a perspective cross-sectional view of a first heat pipe, a second and a fixing structure of the portable electronic device in FIG. 1.

Please refer to FIG. 1 to FIG. 4, where FIG. 4 is a perspective cross-sectional view of the heat pipe assembly 400 of the portable electronic device 10 in FIG. 1.

In this embodiment, the heat pipe assembly 400 includes a first heat pipe 410, a second heat pipe 420, a fixing structure 440 and a sealing ring 450.

The first heat pipe 410 includes a first end part 411 and a second end part 412 that are two opposite ends of the first heat pipe 410. In this embodiment, the first end part 411 includes a narrower portion 4110 and a wider portion 4111 which are connected to each other. The first heat pipe 410 has, for example, a first vapor channel 413 located in the wider portion 4111 and configured for a coolant (not shown) to flow therethrough. The narrower portion 4110 has an insertion hole 4112 and an external thread 4113. The narrower portion 4110 has an insertion opening 4114 and a side opening 4115 connected to each other. The insertion opening 4114 is formed at an end surface 4116 of the narrower portion 4110. The side opening 4115 is formed on an outer surface 4117 of the narrower portion 4110 and extends from the insertion opening 4114 on the end surface 4116 along an axial direction D1 of the narrower portion 4110. The external thread 4113 are formed on the outer surface 4117 of the narrower portion 4110. The second end part 412 is in thermal contact with the heat source 102.

In addition, the wider portion 4111 of the first end part 411 of the first heat pipe 410 is disposed through the ring-shaped part 3041, and the wider portion 4111 of the first end part 411 is fixed in the hole 3042. The hole 3042 and the pivot part 302 both are disposed on the central axis C and are coaxial, such that the wider portion 4111 of first end part 411 is positioned about the central axis C; that is to say, the ring-shaped part 3041 helps the wider portion 4111 of the first end part 411 to be coaxially connected to the pivot part 302.

The second heat pipe 420 includes a third end part 421 and a fourth end part 422. The third end part 421 and the fourth end part 422 are two opposite ends of the second heat pipe 420. The second heat pipe 402 has, for example, a second vapor channel 424 configured for another coolant (not shown) to flow therethrough. The third end part 421 is pivotally inserted into the insertion hole 4112 of the narrower portion 4110 of the first end part 411 via the insertion opening 4114. The third end part 421 is disposed on the central axis C and is coaxial with the first end part 411. The fourth end part 422 is in thermal contact with the metal casing 201. In addition, the heat pipe assembly 400 further includes an annular protrusion 4210, where the annular protrusion 4210 radially protrudes from the third end part 421, and the annular protrusion and the third end part 421 are, for example, integrally formed or made of a single piece.

The fixing structure 440 is, for example, a sleeve having an internal thread 441. The external thread 4113 located on the narrower portion 4110 of the first end part 411 can be engaged with the internal thread 441, such that the fixing structure 440 can be fixed to the narrower portion 4110 of the first end part 411, and the narrower portion 4110 of the first end part 411 is clamped between the fixing structure 440 and the third end part 421. Since the engagement relationship between the external thread 4113 and the internal thread 441, as the external thread 4113 is engaged with the internal thread 441, the narrower portion 4110 is deformed so that the side opening 4115 tapers toward the end surface 4116. In this way, the narrower portion 4110 of the first end part 411 would contact the third end part 421 in a tighter manner.

Note that the external thread 4113, the internal thread 441 and the side opening 4115 are optional. In other embodiments, the first end part may not have the external thread 4113, the fixing structure may not have the internal thread 441, and the narrower portion of the first end part and the fixing structure may be fixed in position in a close-fit manner, and the narrower portion may not have the side opening 4115.

In this embodiment, the heat pipe assembly 400 further includes a blocking portion 442. The blocking portion 442 and the internal thread 441 are respectively located on two opposite sides of the fixing structure 440, and the blocking portion 442 radially protrudes from another side of the fixing structure 440. In this embodiment, the blocking portion 442 has a guide surface 4420. While the third end part 421 is being inserted into an insertion hole (not labeled) of the fixing structure 440, the annular protrusion 4210 presses against the guide surface 4420 so that the blocking portion 442 is deformed to cause an insertion opening (not labeled) formed by the guide surface 4420 to be widen, thereby allowing the fixing structure 440 to be inserted to the third end part 421 in a smooth manner. Two opposite sides of the annular protrusion 4210 of the third end part 421 respectively press against the end surface 4116 of the narrower portion 4110 of the first end part 411 and the blocking portion 442. Moreover, the blocking portion 442 and the fixing structure 440 are, for example, integrally formed or made of a single piece.

Note that the annular protrusion 4210 and the blocking portion 442 are optional. In other embodiments, the heat pipe assembly may not include the annular protrusion 4210 and the blocking portion 442; in such a case, the fixing structure and the third end part can be fixed in position by an existing positioning component that is fixed to the base.

The sealing ring 450 is clamped by the fixing structure 440 and the third end part 421 so as to enhance the airtightness of the space formed by the fixing structure 440 and the third end part 421. Furthermore, the annular protrusion 4210 presses against the blocking portion 442 via the sealing ring 450.

Note that the fixing structure 440 and the sealing ring-shaped part 450 are optional. In other embodiments, the heat pipe assembly may not include the fixing structure 440, and the first heat pipe and the second heat pipe are kept coaxially connected merely by inserting the third end part of the second heat pipe into the narrower portion of the first end part of the first heat pipe. Further, in the embodiments where the heat pipe assembly does not include the fixing structure, the heat pipe assembly may not include the sealing ring.

Figure 5:
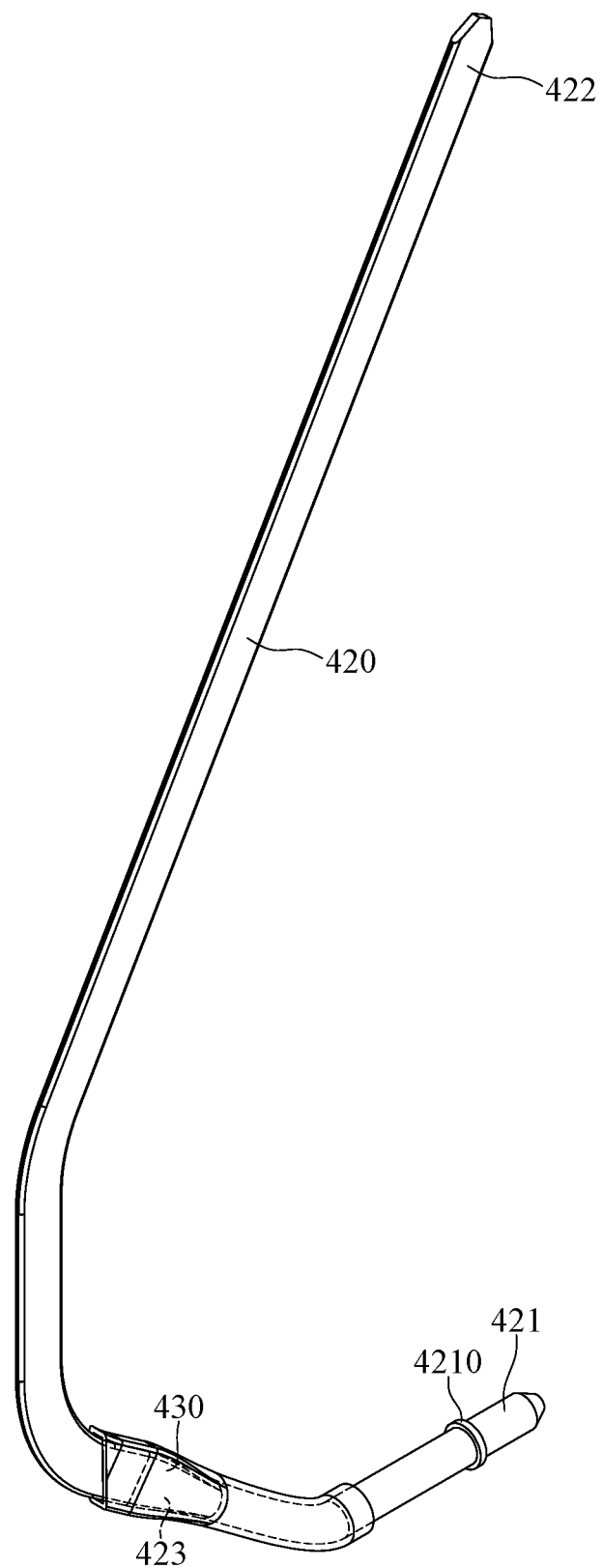
FIG. 5 is a perspective view of the second heat pipe and a reinforcement structure of the portable electronic device in FIG. 1.
Figure 6:
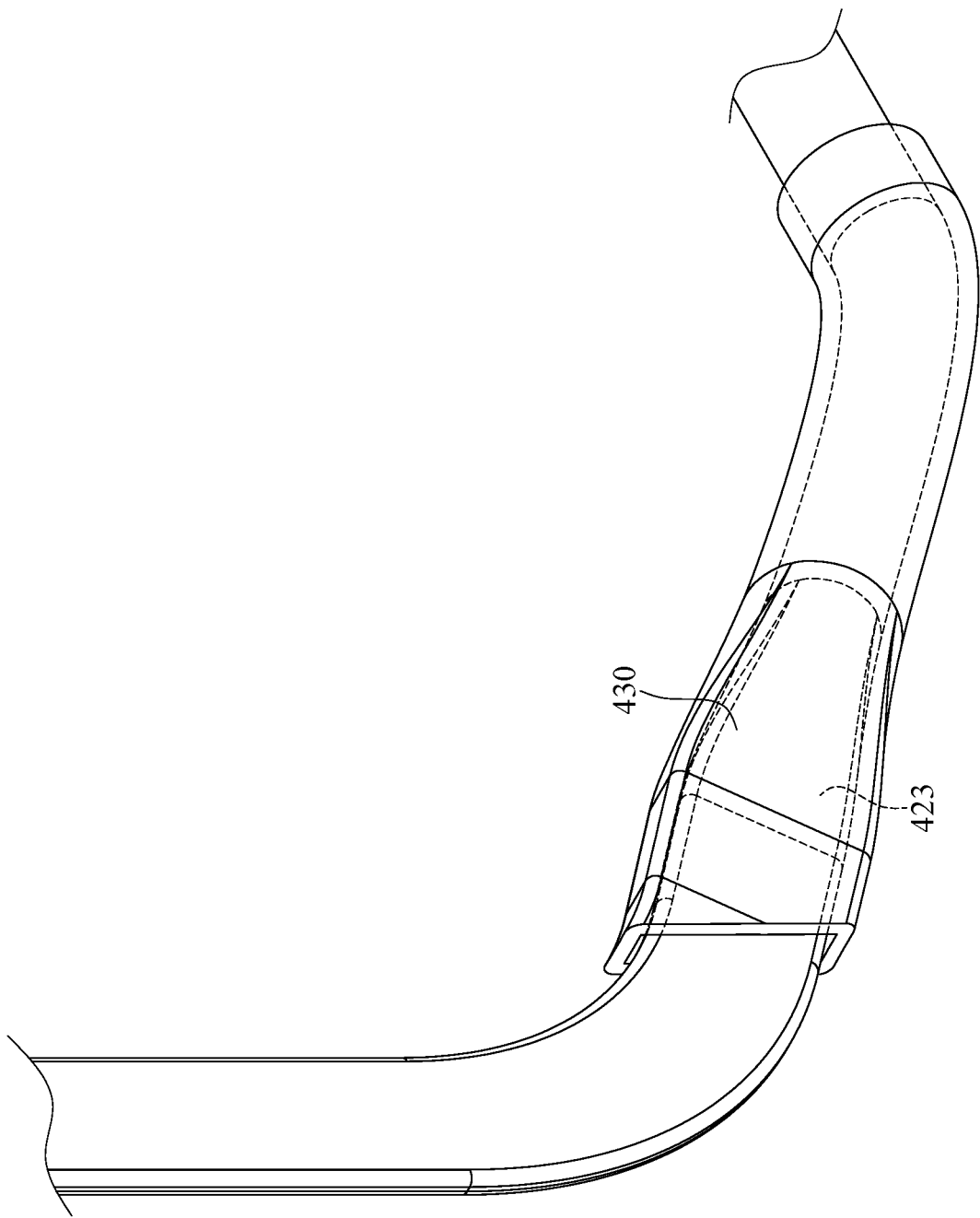
FIG. 6 is partially enlarged perspective view of a bend part and the reinforcement structure in FIG. 5.

In addition, please refer to FIG. 1, FIG. 5 and FIG. 6, where FIG. 5 is a perspective view of the second heat pipe 420 and a reinforcement structure 430 of the portable electronic device in FIG. 1, and FIG. 6 is partially enlarged perspective view of a bend part 423 and the reinforcement structure 430 in FIG. 5. In this embodiment, the second heat pipe 420 further includes a bend part 423. The bend part 423 is located between the third end part 421 and the fourth end part 422, and extends from an end of the bend part 423 that is located close to the third end part 421 to the other end of the bend part 423 that is located close to the fourth end part 422 so as to extend from the host body 100 to the display body 200. In this embodiment, the heat pipe assembly 400 further includes a reinforcement structure 430. The reinforcement structure 430 is fixed on the bend part 423 and, for example, entirely covers the bend part 423 to share the stress applied on the bend part 423.

Note that the reinforcement structure 430 is optional. In other embodiments, the heat pipe assembly may not include the reinforcement structure 430, and an existing support fixed to the metal casing can be used to share the stress applied on the bend part.

Figure 7:
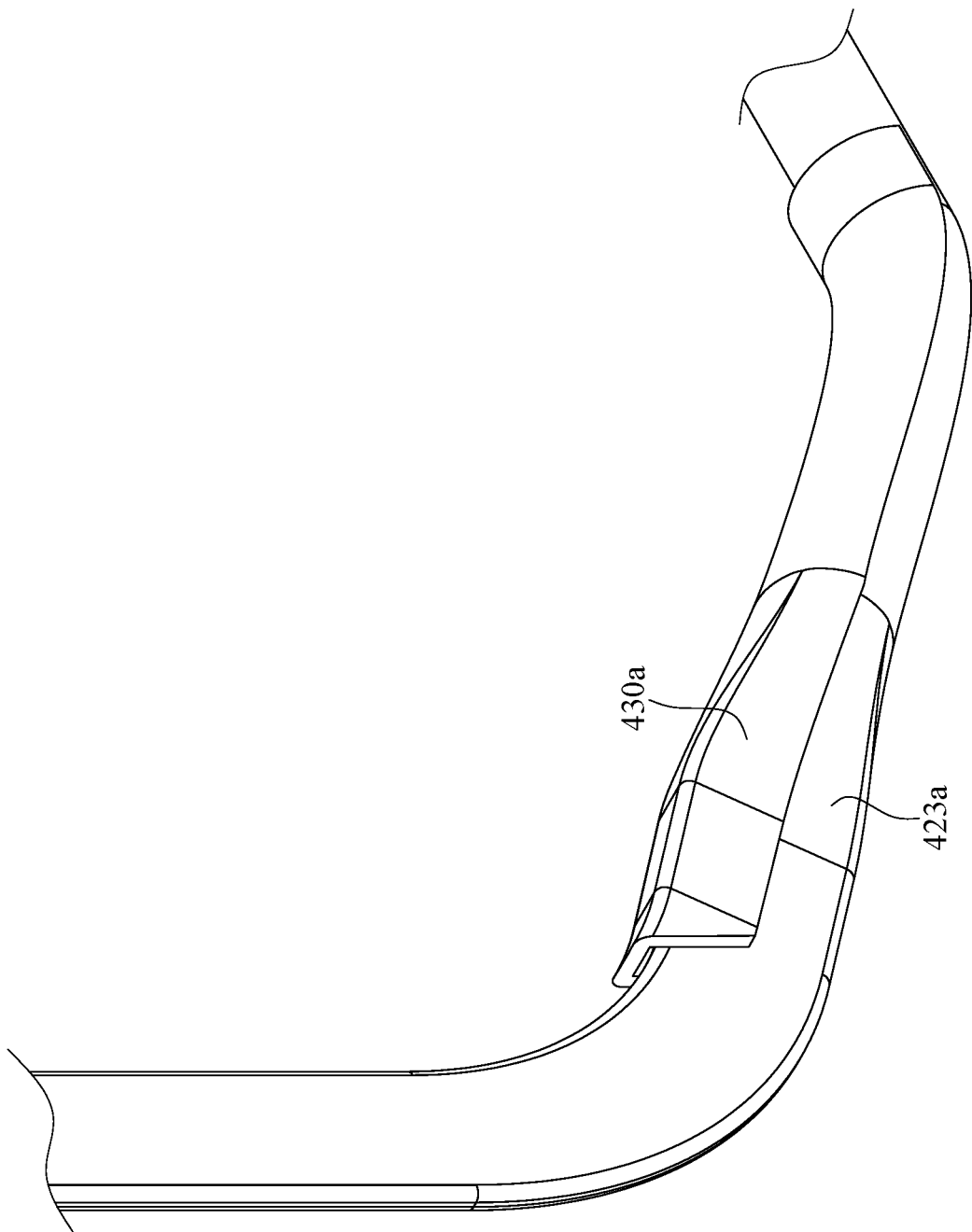
FIG. 7 is a partially enlarged perspective view of a bend part and a reinforcement structure according to a second embodiment of the invention.

In addition, in other embodiments, the reinforcement structure may partially cover the bend part 423. Please refer to FIG. 7, where FIG. 7 is a partially enlarged perspective view of a bend part 423a and a reinforcement structure 430a according to a second embodiment of the invention; in this embodiment, the reinforcement structure 430a is fixed to the bend part 423a by, for example, welding, and the reinforcement structure 430a partially covers the bend part 423a.

According to the portable electronic device discussed above, the positioning structure is integrally formed with the first fixed part of the hinge, one side of the positioning structure is connected to the first fixed part, and another side of the positioning structure is fixed to the wider portion of the first end part of the first heat pipe. Thus, the wider portion of the first end part of the first heat pipe and the pivot part of the hinge are coaxially connected, such that the third end part of the second heat pipe inserted into the insertion hole of the narrower portion of the first end part is kept coaxial with the pivot part of the hinge. Therefore, during the pivoting movement of the first heat pipe and the second heat pipe, the stress on the first heat pipe and the second heat pipe is reduced, such that the first heat pipe and the second heat pipe are prevented from being damaged by the pivoting movement.

In addition, the fixing structure is fixed to the narrower portion of the first end part of the first heat pipe, such that the narrower portion of the first end part is clamped between the fixing structure and the third end part. Therefore, the fixing structure can further keep the narrower portion of the first end part of the first heat pipe to be coaxial with the third end part of the second heat pipe that is inserted into the insertion hole. In this way, due to the cooperation of the positioning structure and the fixing structure, the first end part of the first heat pipe, the third end part of the second heat pipe that is inserted into the insertion hole, and the pivot part are coaxially connected.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A portable electronic device, comprising:
a host body, comprising a base and a heat source disposed on the base;
a display body, comprising a metal casing and a display device disposed on the metal casing;
a hinge, comprising a first fixed part, a pivot part, a second fixed part and a positioning structure, wherein two opposite sides of the pivot part are respectively pivotally connected to the first fixed part and the second fixed part, a side of the positioning structure is connected to the first fixed part, the first fixed part is fixed to the base, and the second fixed part is fixed to the metal casing; and
a heat pipe assembly, comprising a first heat pipe and a second heat pipe, wherein an end part of the first heat pipe has an insertion hole, an end part of the second heat pipe is pivotally inserted into the insertion hole of the end part of the first heat pipe, another end part of the first heat pipe is in thermal contact with the heat source, and another end part of the second heat pipe is in thermal contact with the metal casing;
wherein another side of the positioning structure is fixed to the end part of the first heat pipe so as to keep the pivot part and the end part of the first heat pipe coaxial;
wherein the heat pipe assembly further comprises a fixing structure, and the fixing structure is fixed on the end part of the first heat pipe, such that the end part of the first heat pipe is clamped by the fixing structure and the end part of the second heat pipe;
wherein the fixing structure is a sleeve, the end part of the first heat pipe has an external thread, the fixing structure has an internal thread, and the external thread is engaged with the internal thread so that the fixing structure is fixed to the end part of the first heat pipe.

2. The portable electronic device according to claim 1, wherein the positioning structure and the first fixed part are integrally formed.

3. The portable electronic device according to claim 1, wherein the positioning structure comprises a body part and a ring, the body part is connected to the first fixed part, the ring-shaped part protrudes from the body part, the ring-shaped part is coaxial with the pivot part, and the end part of the first heat pipe is disposed through the ring.

4. The portable electronic device according to claim 1, wherein the end part of the first heat pipe has an insertion opening and a side opening, the insertion opening is formed at an end surface of the end part of the first heat pipe, and the side opening extends from the insertion opening on the end surface of the end part of the first heat pipe along an axial direction of the end part of the first heat pipe.

5. The portable electronic device according to claim 1, wherein the heat pipe assembly further comprises a annular protrusion and a blocking portion, the annular protrusion radially protrudes from the end part of the second heat pipe, a side of the fixing structure is fixed to the end part of the first heat pipe, the blocking portion radially protrudes from another side of the fixing structure, and two opposite sides of the annular protrusion respectively press against an end surface of the end part of the first heat pipe and the blocking portion.

6. The portable electronic device according to claim 1, wherein the heat pipe assembly further comprises a sealing ring-shaped part clamped by the fixing structure and the end part of the second heat pipe.

7. The portable electronic device according to claim 1, wherein the heat pipe assembly further comprises a reinforcement structure, the second heat pipe further comprises a bend part, the bend part is located between the end part of the second heat pipe and the another end part of the second heat pipe, and the reinforcement structure is fixed to the bend part.

8. The portable electronic device according to claim 7, wherein the reinforcement structure entirely or partially covers the bend part.

* * * * *